United States Patent

Wilk et al.

[11] Patent Number: 5,878,285
[45] Date of Patent: Mar. 2, 1999

[54] CAMERA WITH MULTIPLE LENSES IN PLANAR ARRAY PARALLEL TO FIXED FILM STRIP

[76] Inventors: Peter J. Wilk, 185 W. End Ave., New York, N.Y. 10023; Robert C. Stirbl, 247 Wadsworth Ave., New York, N.Y. 10033

[21] Appl. No.: 98,165

[22] Filed: Jul. 28, 1993

[51] Int. Cl.⁶ .......................... G03B 17/02; G03B 17/18; G03B 41/00
[52] U.S. Cl. .............. 396/6; 396/200; 396/201; 396/322
[58] Field of Search ...................... 354/110, 118, 354/120, 121, 126, 145.1, 219, 465, 195.12; 352/46; 396/6, 322, 323, 324, 326, 332, 333, 155, 159, 200, 201, 439, 452; 362/3, 16

[56] References Cited

U.S. PATENT DOCUMENTS

| | | | |
|---|---|---|---|
| 844,152 | 2/1907 | Little | 354/187 |
| 3,202,069 | 8/1965 | Cummins et al. | 354/120 |
| 3,283,685 | 11/1966 | Cummins | 354/118 |
| 3,558,226 | 1/1971 | Riggs et al. | 354/120 X |
| 3,703,135 | 11/1972 | Lang | 354/120 |
| 3,918,073 | 11/1975 | Henderson et al. | 354/120 |
| 4,023,031 | 5/1977 | Storey | 362/281 |
| 4,145,131 | 3/1979 | Yevick | 354/120 X |
| 4,304,479 | 12/1981 | Van Allen | 354/145.1 |
| 4,527,874 | 7/1985 | Ohmura | 354/195.12 |
| 4,560,261 | 12/1985 | Ueda et al. | 354/121 |
| 4,769,660 | 9/1988 | Heinrich | 354/120 |
| 5,043,751 | 8/1991 | Rice | 354/187 |
| 5,046,833 | 9/1991 | Tsuchida | 359/654 |
| 5,210,557 | 5/1993 | Kameyama et al. | 354/120 |
| 5,222,025 | 6/1993 | Taylor, II | 359/851 X |

*Primary Examiner*—Safet Metjahic
*Assistant Examiner*—J. K. Han
*Attorney, Agent, or Firm*—R. Neil Sudol; Henry D. Coleman

[57] ABSTRACT

A camera device having photosensitive film, a frame connected to the film for holding the film fixed in a first plane, and a plurality of lenses of several predetermined focusing powers mounted to the frame and disposed in a second plane spaced from and parallel to the plane of the film. A shutter assembly is mounted to the frame for enabling light transmission selectively through the lenses and onto the film. The shutter assembly is actuated by shutter activation componentry mounted to the frame and operatively connected to the shutter assembly. A Fresnel lens and a Fresnel reflector are mounted to the frame and disposed on opposite sides of a light source for providing artificial illumination for the camera. Each lens is assocaited with a respective viewfinder and a respective camera exposure indicator. The camera a designed for storage and transport in a wallet or billfold.

11 Claims, 4 Drawing Sheets

CAMERA WITH MULTIPLE LENSES IN PLANAR ARRAY PARALLEL TO FIXED FILM STRIP

BACKGROUND OF THE INVENTION

This invention relates to a camera. More particularly, this invention relates to a disposable camera which is capable of being carried in a shirt pocket. This invention also relates to an associated method of taking photographs.

A recent development in photography is the disposable camera. Generally, such cameras are somewhat smaller than the conventional single lens reflex cameras preferred by afficionados. The disposable camera, however, is simple to operate. It is only necessary to aim the camera and press the shutter release button.

A problem with such disposable cameras is their size. They can be carried in a glove compartment of an automobile or in a briefcase, purse or coat pocket. However, they are too bulky to be carried in a suit or shirt pocket.

OBJECTS OF THE INVENTION

An object of the present invention is to provide a camera which is capable of being carried unobtrusively in a suit pocket or a shirt pocket.

Another object of the present invention is to provide such a camera which has a thickness on the order of a credit-card-size calculator.

Another, more particular, object of the present invention is to provide such a camera which is easy to use.

A further object of the present invention is to provide an associated method of taking photographs.

These and other objects of the present invention will be apparent from the drawings and detailed descriptions herein.

SUMMARY OF THE INVENTION

A camera device comprises, in accordance with the present invention, photosensitive film, a frame connected to the film for holding the film fixed in a first plane, and a plurality of lenses mounted to the frame and disposed in a second plane spaced from and parallel to the plane of the film. A shutter assembly is mounted to the frame for enabling light transmission selectively through the lenses and onto the film. The shutter assembly is actuated by shutter activation componentry mounted to the frame and operatively connected to the shutter assembly.

According to another feature of the present invention, the camera device further comprises a flash generator mounted to the frame for generating a flash of light substantially simultaneously with an operation of the shutter assembly. The flash generator preferably includes a light source and a concentrator for directing or redirecting light produced by the light source. To that end, the concentrator may include a Fresnel reflector disposed on one side of the light source and Fresnel lens disposed on a side of the light source opposite the Fresnel reflector.

According to a further feature of the present invention, the film is disposed on a single sheet. The sheet may include a plurality of photosensitive areas separated by spaces insensitive to light.

According to an additional feature of the present invention, the lenses include lenses of different focusing powers. The lenses may be arranged in a rectangular array, lenses of similar power being disposed in a linear array in the rectangular array.

Where the shutter assembly includes a plurality of spring loaded shutters, the activation componentry includes a plurality of releasable catches in contact with respective ones of the shutters.

According to a supplemental feature of the present invention, the camera device further comprises a plurality of exposure indicators equal in number to the shutters and paired with respective ones of the shutters, to indicate whether the shutters have been activated. The exposure indicators are mounted to the camera frame.

The lenses may be Grin lenses injection molded in a single sheet which is attached to the camera frame.

The camera device may additionally comprise a plurality of viewfinder apertures on the camera frame, the apertures being paired with respective ones of the lenses.

According to another feature of the present invention, the shutter activation componentry includes a sequencer for automatically activating the shutter assembly to allow light to pass through the lenses in a predetermined sequence upon a single actuation of the camera device by the user. Where the shutter assembly includes a plurality of independently actuatable shutters equal in number to the lenses, the sequencer may include electrical circuitry operatively connected to the shutters for actuating the shutters in the predetermined sequence. Alternatively, the shutter assembly may include a single shutter member, while the sequencer includes a mechanical subassembly for shifting the shutter past a plurality of the lenses upon a single actuation of a control button.

A method for taking photographs comprises, in accordance with the present invention, the steps of (a) providing photosensitive film and a plurality of lenses mounted to a frame in a plane spaced from and parallel to the film, (b) selectively and sequentially exposing different areas of the film via different ones of the lenses, and (c) maintaining the film fixed relative to the lenses during the step of exposing.

Where the step of providing includes the step of providing a plurality of selectively actuatable shutters in an array substantially parallel to the film, the step of exposing includes the step of selectively operating the shutters to permit transmission of light through respective ones of the lenses onto the different areas of the film.

Pursuant to another feature of the present invention, the exposing of the film includes the step of automatically activating a shutter mechanism to allow light to pass through the lenses in a predetermined sequence upon a single actuation by a user.

A camera in accordance with the present invention can be essentially of credit card size and has a thickness on the order of a credit-card-size calculator. Accordingly, a camera in accordance with the present invention can be carried in a wallet, a suit pocket or a shirt pocket.

In a camera in accordance with the present invention each picture area on the film corresponds to a respective actuator. Accordingly, the operation of the camera is easy to comprehend. An associated method of taking photographs is easy and straightforward.

DETAILED DESCRIPTION

Figures 1, 2:
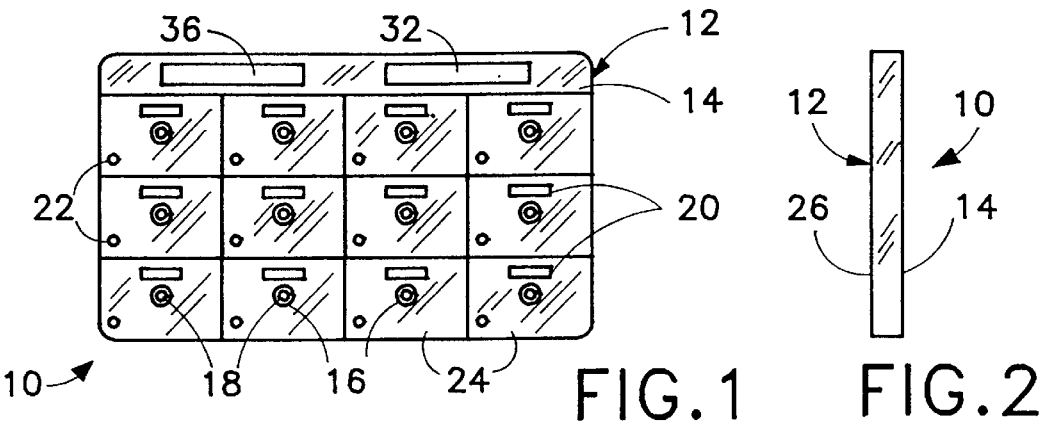
FIG. 1 is a front elevational view of a pocket camera in accordance with the present invention.
FIG. 2 is a side view of the camera of FIG. 1.

As illustrated in FIG. 1, a pocket-size camera 10 comprises a substantially flat frame or housing 12 provided along a front side or face 14 with a plurality of apertures 16 disposed in a rectangular array. Each aperture 16 is aligned with an underlying lens 18 disposed in a plane extending parallel to the front side 14. Face 14 is also provided with a plurality of viewfinder windows 20 equal in number to apertures 16 and also disposed in a rectangular array.

Apertures 16, lenses 18, and windows 20, as well as a plurality of actuator buttons 22, define a plurality of modular, single-shot camera elements 24 disposed in a rectangular array. Each camera element 24 thus includes a respective focusing lens 18, a respective viewfinder window 20, aperture 16, and a respective actuator button 22.

Camera 10 is thin enough, as illustrated in FIG. 2, to fit into a shirt pocket or an inside suit pocket.

Figure 3:
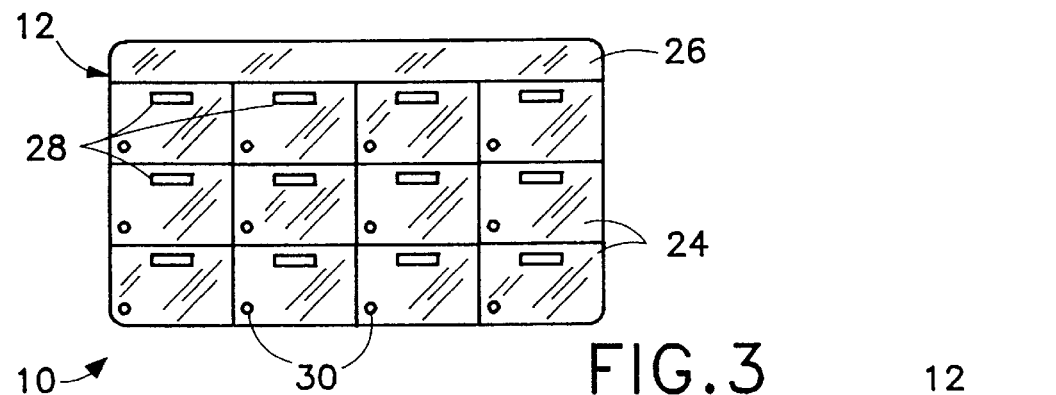
FIG. 3 is a rear elevational view of the camera of FIGS. 1 and 2.

As depicted in FIG. 3, camera 10 has a rear side or face 26 provided with a plurality of viewfinder windows or openings 28 aligned with windows 20 and a plurality of indicator elements 30 for indicating which camera elements 24 have been used or subjected to an exposure operation by the pressing of respective buttons 22.

Figure 4:
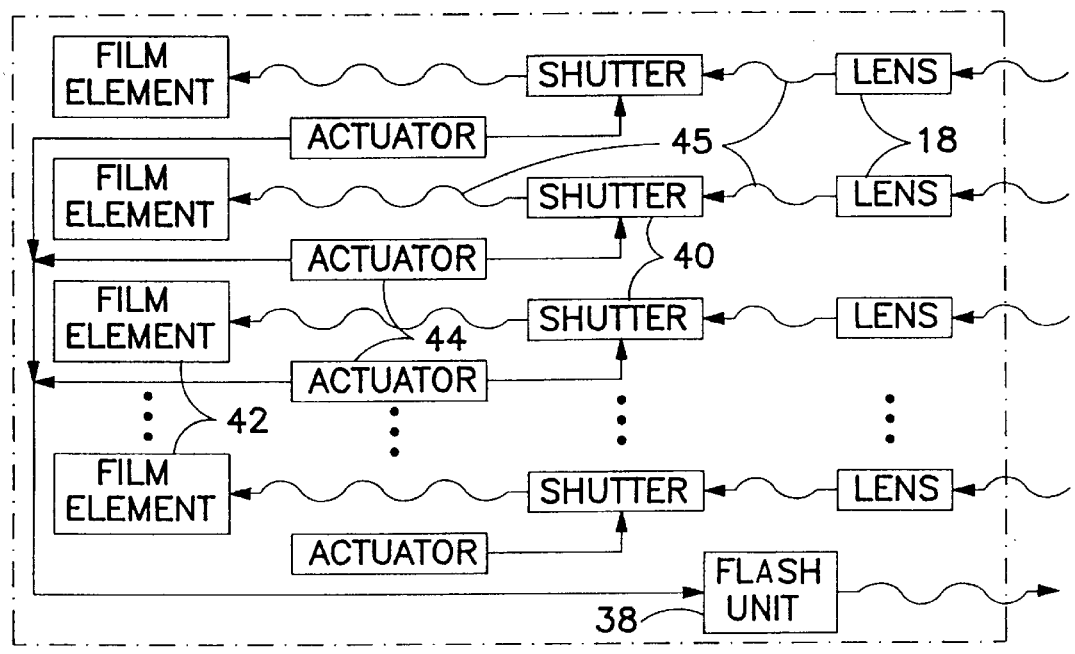
FIG. 4 is a block diagram of operative components of the camera of FIGS. 1–3.
Figure 7:
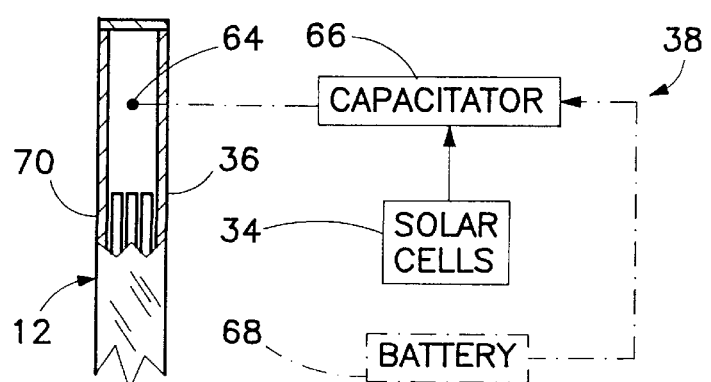
FIG. 7 is partially a block diagram and partially a partial cross-sectional view of a flash unit of the camera of FIGS. 1–5.

As further illustrated in FIG. 1, camera 10 includes in front face 14 a first additional window 32 through which solar radiation falls upon solar cells 34 (FIG. 7) and a second additional window 36 forming part of a flash unit 38 (see FIGS. 4 and 7).

As shown in FIG. 4, camera 10 further includes a plurality of shutter mechanisms 40 which are paired with respective lenses 18 on one side and respective film elements 42 on an opposite side. Generally, film elements 42 lie in a plane parallel to the plane of lenses 18.

Each shutter mechanism 40 is triggered by a respective manually operated actuator 44 such as a switch or latch in turn operated by a respective button 22. Actuators 44 are also connected to flash unit 38 for triggering the operation of that component of camera 10.

FIG. 4 schematically illustrates the path of light rays 45 traveling through lenses 18, respective shutter mechanisms 40 and onto respective film elements 42 upon the activation of respective shutter actuators 44. It is to be noted that generally only one shutter mechanism 40 will be released at a time, in the contemplation of the present invention.

Figure 5:
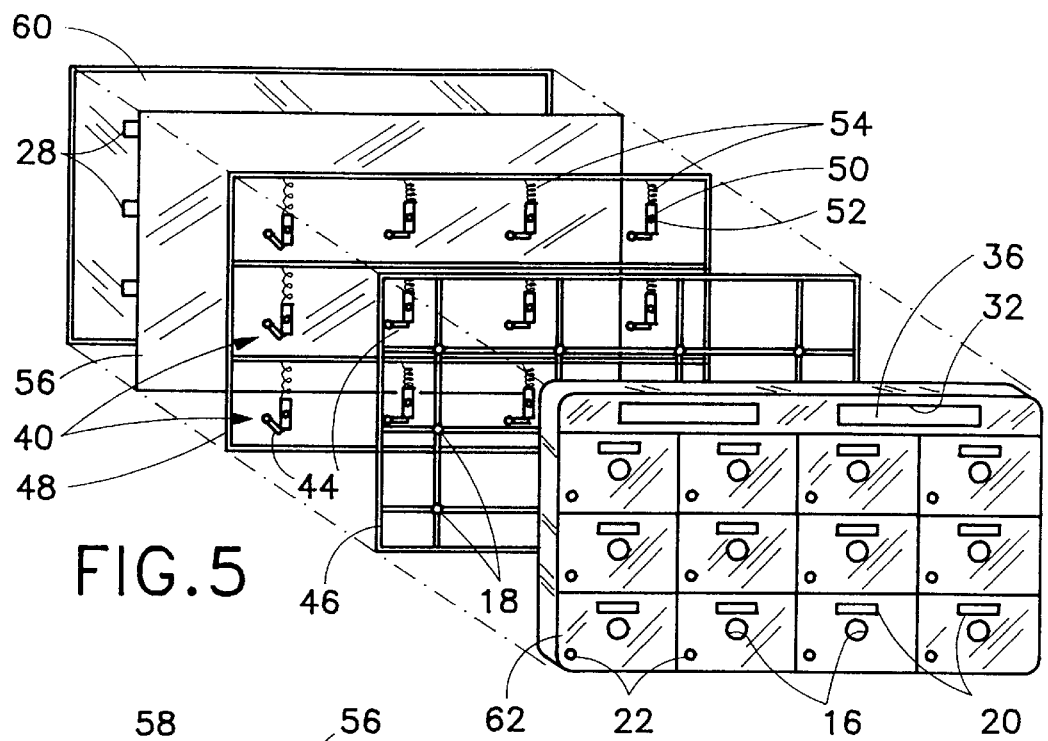
FIG. 5 is an exploded view of the camera of FIGS. 1–3.

FIG. 5 is an exploded view of the camera of FIGS. 1–3. Lenses 18 may be plastic Grin type lenses which are injection molded as integral parts of a frame 46 which exemplarily takes the form of a substantially planar grid. Frame 46 fits into housing 12 so as to center lenses 18 behind apertures 16.

Another frame or positioning grid 48 carries shutter mechanisms 40 which may take the form of linearly shiftable plates 50 each provided with a central aperture 52 and loaded by a compression spring 54. Actuators 44 take the form of respective catches or detents which prevent a linear motion of the respective shutter plates 50 until released by buttons 22. Three vertically aligned shutter plates at the left of frame or grid 48 have been activated or released, while the remaining shutter plates are in a prefiring position, held by actuators 44. Actuators 44 are illustrated schematically, suspended in space in FIG. 5. The actuators 44 may be connected to frame or grid 48 or even housing 12.

Figure 6:
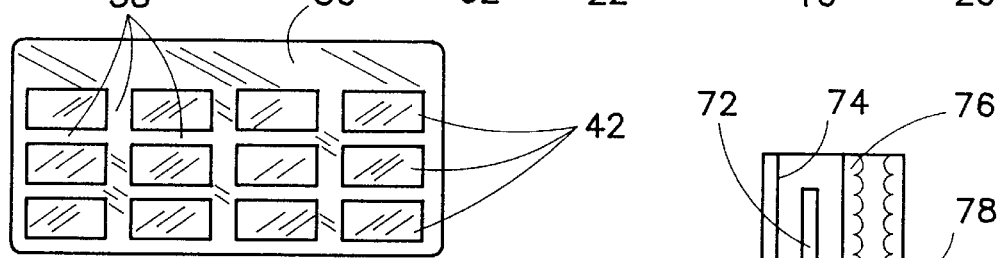
FIG. 6 is a front elevational view of a film sheet included in the camera of FIGS. 1–5.

Behind shutter frame or grid 48 is a sheet or web 56 of photosensitive film. The different film elements or areas 42 (FIG. 4) are disposed on or are part of sheet 56. As illustrated in FIG. 6, film elements 42 are spaced from one another on film sheet by non-photosensitive areas 58. Alternatively, film elements 42 may be separate webs attached to a housing back panel 60 in which apertures or openings 28 are located. Back panel 60, as well as a front panel 62 of camera 10, is provided with a thermally reflective layer (not shown) for protecting film elements 42.

Lenses 18 may include lenses of different focusing powers, with lenses of similar power being disposed in a common linear array in the rectangular array of modular camera elements 24. For example, the four columns of camera elements 24 in the array of camera 10, illustrated in FIGS. 1, 3, and 5, may have normal lenses, telephoto lenses, wide angle lenses and close up lenses, respectively. Depending on the particular shot, the user selects the next unused or available camera element 24 in the appropriate column.

As illustrated in FIG. 7, flash unit 38 includes a Xenon (white light) point source 64 energized by a capacitor 66 in turn charged by solar cells 34 or a battery 68. Window 36 is a Fresnel lens, while a holographic, embossed and metallized Fresnel reflector 70 is positioned on a rear side of light source 64, opposite lens 36. Fresnel reflector 70 and Fresnel lens 36 cooperate to direct light from source 64 in a generally forward direction from camera 10.

Figure 8:
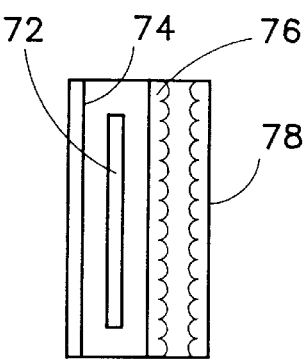
FIG. 8 is a diagram of another flash unit utilizable in the camera of FIGS. 1–5.

In another embodiment of a flash unit, illustrated in FIG. 8, an elongate or linear Xenon source 72 is placed between a reflective rear surface 74 and a pair of lenticular lenses 76 and 78. Lenses 76 and 78 cooperate with one another to collimate light emanating from Xenon source 72 directly or upon reflection from surface 74.

Figure 9:
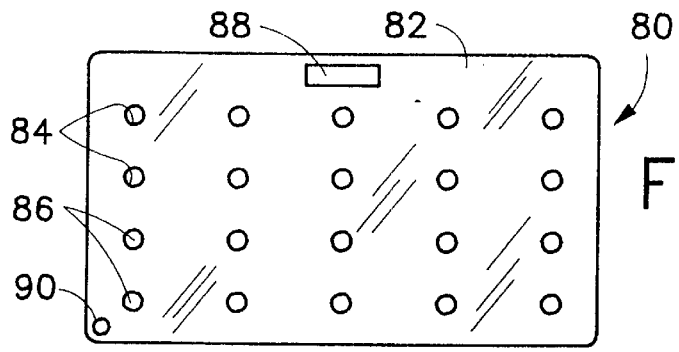
FIG. 9 is a front elevational view of another pocket camera in accordance with the present invention.

As illustrated in FIG. 9, a pocket-size camera 80 comprises a substantially flat frame or housing 82 provided with a plurality of apertures 84 disposed in a rectangular array. As desribed hereinabove with reference to FIG. 1, each aperture 84 is aligned with an underlying lens 86. Housing 82 is also provided with a viewfinder window 88 and an actuation button 90.

Figure 10:
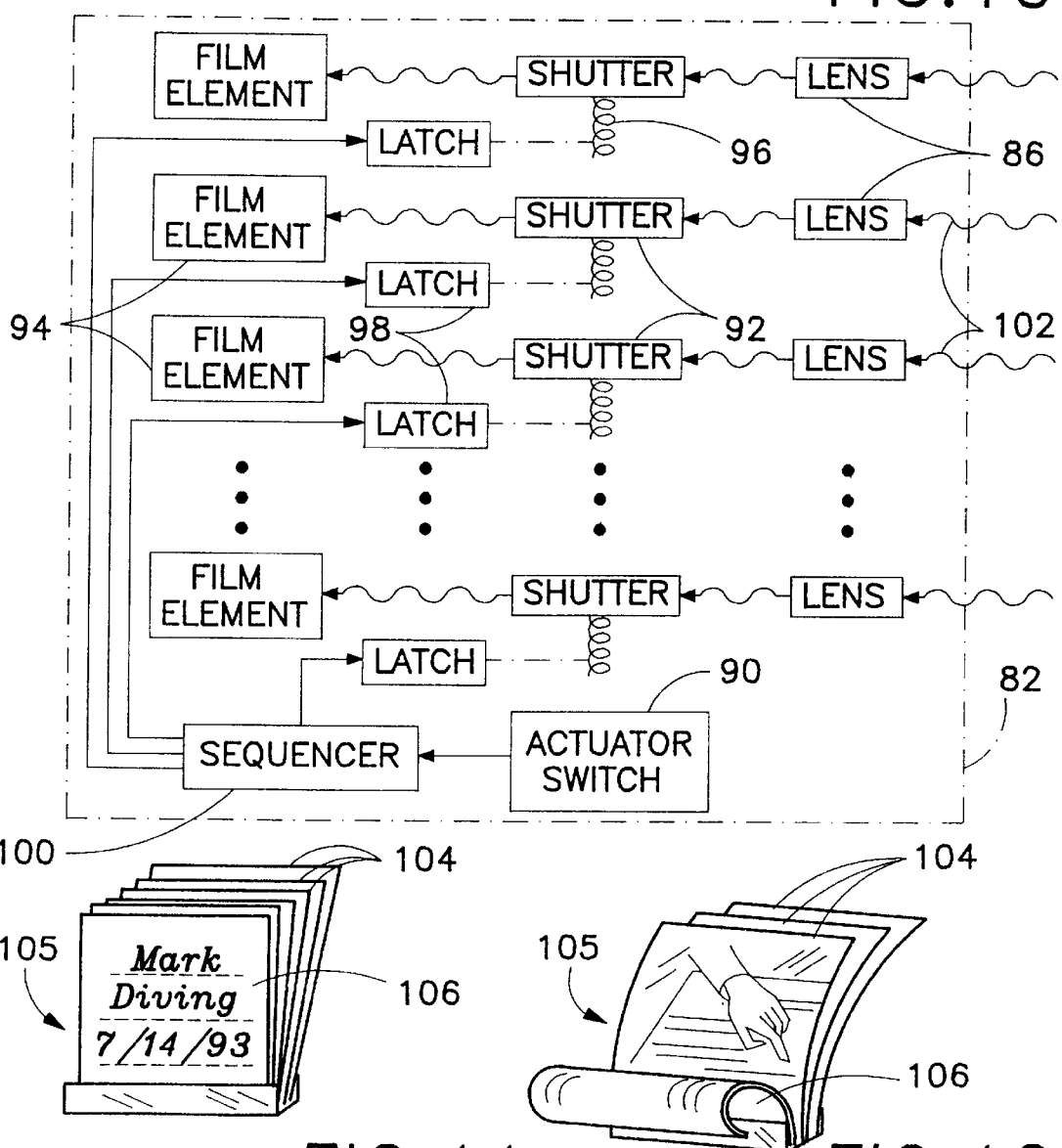
FIG. 10 is a block diagram of operative components of the camera of FIG. 9.

As shown in FIG. 10, camera 80 includes a plurality of shutter mechanisms 92 which are paired with respective lenses 86 on one side and respective film elements 94 on an opposite side. Generally, film elements 94 lie in a plane parallel to the plane of lenses 86.

Each shutter mechanism 92 is spring loaded as indicated at 96 and is triggered by a respective switch or latch 98 which is operated in response to a respective electrical signal emitted by a sequencing circuit 100. Sequencing circuit 100 is in turn triggered by actuator button or switch 90.

FIG. 10 schematically illustrates the path of light rays 102 traveling through lenses 86, respective shutter mechanisms 92 and onto respective film elements 94 upon the triggering of latches or switches 98. It is to be noted that generally only one shutter mechanism 92 will be released at a time, in a sequence determined by sequencing circuit or programmer 100.

Figure 11:
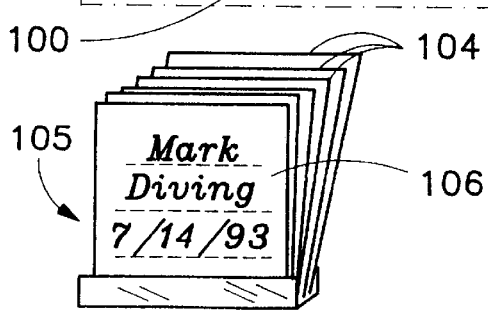
FIG. 11 is a schematic perspective view of a book of photographs taken with the camera of FIGS. 9 and 10.
Figure 12:
FIG. 12 is another schematic perspective view of the book of FIG. 11, showing use of the book to provide an illusion of movement of a photographed subject.

Film elements 94 are exposed in a sequence to photographically capture a limited motion of a subject. As illustrated in FIG. 11, photographs 104 developed from exposed film elements 94 can be bound in a small book 105 which may be labeled on a front cover 106 as to subject and date. As illustrated in FIG. 12, the bound photographs 104 may be fanned with a thumb (not illustrated) to provide an illusion of motion of the subject.

Figure 13:
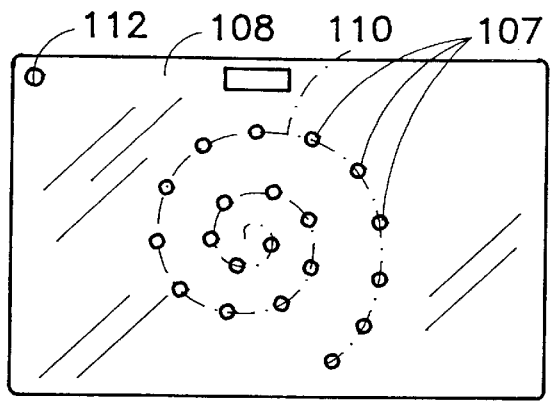
FIG. 13 is a front elevational view of yet another pocket camera in accordance with the present invention.
Figure 14:
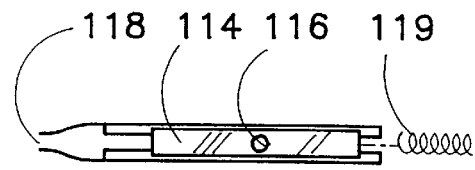
FIG. 14 is a schematic partial elevational view of a shutter mechanism in the camera of FIG. 13.

FIG. 13 depicts another arrangement of lenses 107 in a camera housing 108. Lenses 107 are disposed in an array with a spiral path 110 of sequential exposure upon the pressing of an actuator button 112. As illustrated in FIG. 14, the sequential exposing of film elements (not shown) may be implemented by an elongate shutter element 114 having a substantially centralized opening 116 and guided along spiral path 110 by tracks or rails 118. Shutter element 114 is pulled along path 110 by a tension spring 119 upon a release thereof via an actuation of button 112.

Figure 15:
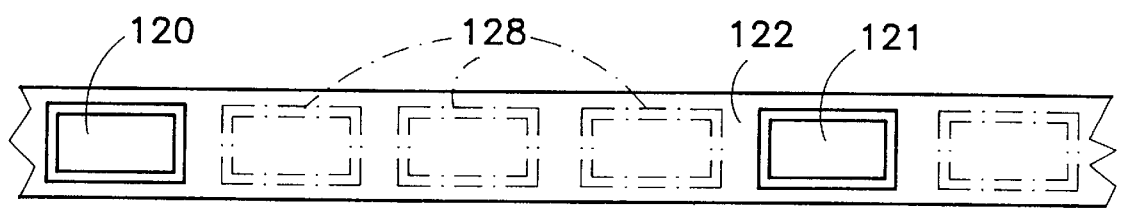
FIG. 15 is a side elevational view of a film strip constructed from a sequence of photographs taken with the camera of FIGS. 9 and 10 or FIGS. 13 and 14.
Figure 16:
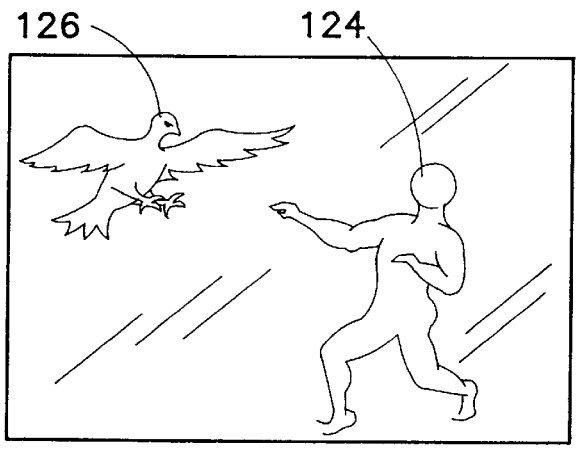
FIG. 16 is a diagram of outlines of selected objects in an exposed film element in the camera of FIGS. 9 and 10 or FIGS. 13 and 14, indicating a step in the production of the film strip of FIG. 15.
Figure 17:
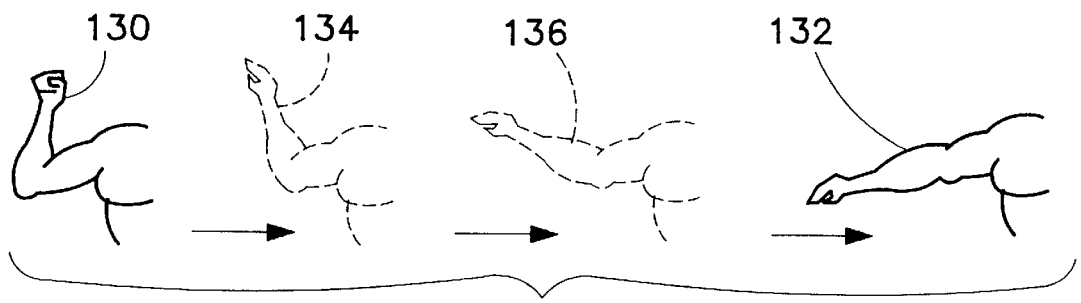
FIG. 17 is a diagram showing two interpolated arm positions in a sequence of arm motions of a subject photographed by the camera of FIGS. 9 and 10 or FIGS. 13 and 14.

As illustrated in FIG. 15, photographs or film transparencies 120 and 121 developed from respective film elements 94 of camera 80 or 108 are disposed on a film strip carrier 122. Photographs or film transparencies 120 and 121 represent successively captured positions of a moving photographed subject such as a man 124 or a bird 126 (see FIG. 16). In order to provide a continuous film strip or video, intervening frames 128 are constructed with the aid of a computer (not shown) programmed to interpolate motion by first analyzing a film according to conventional pattern recognition techniques to determine outlines for the respective subjects 124 and 126 in the developed film elements, as indicated in FIG. 16. The successive outlines for each moving subject are then analyzed by the computer to determine intervening positions of different portions of the subjects. For example, in FIG. 17, successive developed photographs may show an arm in a folded configuration 130 and an outstretched configuration 132. The computer determines from those outlines a plurality of intervening configurations 134 and 136. The computer constructs intervening frames 128 (FIG. 15) by positioning the interpolated configurations 134 and 136 of each moving subject 124 on a common background. The background is determined by overlapping the backgrounds from the different developed frames or transparencies 120 and 121.

Film elements exposed in sequence as described hereinabove with reference to FIGS. 9–14 may be processed to yield a holographic print wherein a photographed subjected appears to move between different positions as captured in different film elements. Similarly, where different film elements, e.g., 42 (FIGS. 4 and 6), are exposed simultaneously, the different views can be combiend to form a single three-dimensional holographic image.

Although the invention has been described in terms of particular embodiments and applications, one of ordinary skill in the art, in light of this teaching, can generate additional embodiments and modifications without departing from the spirit of or exceeding the scope of the claimed invention. It is to be noted, for example, that many different, but equivalent, shutter mechanisms are possible in accordance with the present invention. Instead of being mechanical, shutter mechanisms 40 may be electronic, without moving parts, such as cholesteric diodes, numatic crystals, or PZT (lead zirconium tantanate) crystals. An alternative mechanical shutter system may be gravity activated. Instead of a spiraling shutter element 114, camera housing 108 may be provided with a shutter wheel (not shown) having an elongate substantially radially oriented straight or arcuate slot for successively opening different lenses in a predetermined sequence alternating between inner and outer tracks of a spiraling or concentric lens array.

Accordingly, it is to be understood that the drawings and descriptions herein are proffered by way of example to facilitate comprehension of the invention and should not be construed to limit the scope thereof.

What is claimed is:

1. A camera device comprising:

photosensitive film;

frame means connected to said film for holding said film fixed in a first plane;

a plurality of lenses of different predetermined focusing powers mounted to said frame means and disposed in a second plane spaced from and parallel to said first plane, said lenses being spaced from one another in said second plane;

shutter means mounted to said frame means for enabling light transmission selectively through said lenses and onto said film; and shutter activation means mounted to said frame means and operatively connected to said shutter means for activating said shutter means in response to manipulation by a user.

2. The device defined in claim 1, further comprising light generating means mounted to said frame for generating a flash of light substantially simultaneously with an operation of said shutter means.

3. The device defined in claim 2 wherein said light generating means includes a light source and concentrator means for concentrating light produced by said light source, said concentrator means including a Fresnel reflector disposed on one side of said light source.

4. The device defined in claim 3 wherein said concentrator means includes a Fresnel lens disposed on a side of said light source opposite said Fresnel reflector.

5. The device defined in claim 1 wherein said film is disposed on a single sheet.

6. The device defined in claim 5 wherein said sheet includes a plurality of photosensitive areas separated by spaces of insensitive to light.

7. The device defined in claim 1 wherein said lenses are arranged in a rectangular array, said lenses including a plurality of lenses of a common power different from powers of other ones of said lenses, the lenses of said common power being disposed in a linear array in said rectangular array.

8. The device defined in claim 1 wherein said shutter means includes a plurality of spring loaded shutters, said activation means including a plurality of releasable catches in contact with respective ones of said shutters.

9. The device defined in claim 8, further comprising a plurality of exposure indicators mounted to the frame to indicate whether said shutters have been activated, said exposure indicators being equal in number to said shutters and paired with respective ones of said shutters.

10. The device defined in claim 1 wherein said lenses are Grin lenses.

11. The device defined in claim 1 wherein said film is divided into a plurality of film areas equal in number to said lenses, further comprising a plurality of exposure indicators equal in number to said lenses and paired with respective ones of said lenses, to indicate that respective film areas have been exposed via said lenses.

* * * * *